United States Patent [19]

[11] 3,883,477
[45] May 13, 1975

[54] COMPOSITIONS STABILIZED WITH 1,4-DISUBSTITUTED-7-AZABICYCLO (2.2.1) HEPTANE-2,5 OR 2, 6-DICARBOXYLIC ACID ESTERS

[75] Inventor: John F. Stephen, New City, N.Y.

[73] Assignee: Ciba-Geigy Corporation, Ardsley, N.Y.

[22] Filed: Dec. 28, 1973

[21] Appl. No.: 429,230

[52] U.S. Cl. .............. 260/45.8 N; 99/163; 252/50; 260/45.85 S; 260/45.85 B; 260/45.85 P; 260/45.95 D; 260/45.95 R; 260/45.95 H; 260/45.7 S
[51] Int. Cl. ..................... C08f 45/60; C08g 51/60
[58] Field of Search .............. 260/45.8 N, 45.85 N; 99/163; 252/50

[56] References Cited
FOREIGN PATENTS OR APPLICATIONS
1,098,356   2/1964   United Kingdom Primary Examiner—V. P. Hoke
Attorney, Agent, or Firm—Nestor W. Shust

[57] ABSTRACT

Organic polymeric materials, especially polyolefins, which are subject to ultraviolet light degradation, are effectively stabilized with compounds having the formula

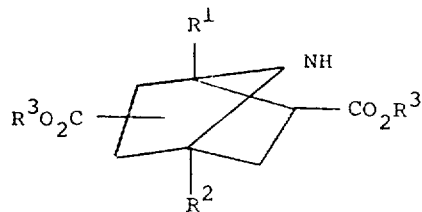

wherein $R^1$ is aryl, $R^2$ is alkyl, benzyl or aryl, and $R^3$ is alkyl.

13 Claims, No Drawings

COMPOSITIONS STABILIZED WITH 1,4-DISUBSTITUTED-7-AZABICYCLO (2.2.1) HEPTANE-2,5 OR 2,6-DICARBOXYLIC ACID ESTERS

DETAILED DISCLOSURE

This invention relates to compositions comprising organic materials which are subject to ultraviolet light degradation stabilized with compounds having the formula

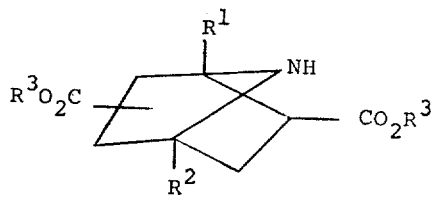

wherein $R^1$ is phenyl or alkyl substituted phenyl, $R^2$ is phenyl, alkyl substituted phenyl, alkyl of 1 to 6 carbons, benzyl or alkyl substituted benzyl and $R^3$ is alkyl group from 1 to 24 carbons.

In the preferred embodiment, $R^1$ is phenyl; $R^2$ is phenyl, benzyl or methyl and most preferable phenyl or benzyl; and $R^3$ is straight or branched alkyl of 1 to 18 carbons and most preferably alkyl groups of 4 to 8 carbons.

It is noted that in the above structure the group -$CO_2R^3$ is floating. That means that said group could be located at either the 5 or the 6 position. It is extremely difficult to determine the exact location of said group, and often the product in fact may contain a mixture of the 2,5- and 2,6- isomers. The mixture is most likely when $R^1$ or $R^2$ groups are dissimilar, while a mixture is less likely when $R^1$ and $R^2$ are the same. It is the intention of this invention to cover both the 2,5- and the 2,6- compounds, the mixtures thereof and the compositions stabilized with the 2,5- and 2,6- compounds and with mixtures thereof.

Esters of 1,4-diphenyl-7-azabicyclo[2.2.1]heptane-2,5- or 2,6- dicarboxylic acid can be prepared by reacting 2,4-diphenyl-$\Delta^2$-oxazolinone-5 with an appropriate acrylate ester as described by Huisgen, Gotthardt and Bayer in Chem. Ber., 103, 2368 (1970). The 2,4-diphenyl-$\Delta^2$-oxazolinone-5 can be obtained according to the procedure of Gotthardt, Huisgen and Bayer described in J. Amer. Chem. Soc., 92, 4340 (1970).

Esters of 1,4-diphenyl-7-azabicyclo[2.2.1]heptane-2,5- or 2,6-dicarboxylic acid can also be obtained by reacting alkali metal salts of 1,4-diphenyl-7-azabicyclo[2.2.1]heptane-2,5- or 2,6- dicarboxylic acid with the appropriate alkyl halide in a dipolar aprotic solvent such as N,N-dimethylformamide. Suitable alkali metal salts include the lithium, sodium and potassium salts. 1,4-diphenyl-7-azabicyclo[2.2.1]heptane-2,5- or 2,6-dicarboxylic acid can be prepared by saponifying methyl 1,4-diphenyl-7-azabicyclo[2.2.1]heptane-2,5- or 2,6-dicarboxylate with aqueous ethanolic potassium hydroxide. Dimethyl 1,4-diphenyl-7-azabicyclo[2.2.1]heptane-2,5- or 2,6-dicarboxylate can be obtained by the procedure of Huisgen, Gotthardt and Bayer, in Chem. Ber., 103, 2368 (1970).

Esters of 1-methyl-4-phenyl and 1-benzyl-4-phenyl-7-azabicyclo[2.2.1]heptane-2,5- or 2,6-dicarboxylic acids can be prepared by reacting 2-phenyl-4-methyl-$\Delta^2$-oxazolinone-5 and 2-phenyl-4-benzyl-$\Delta^2$-oxazolinone-5, respectively, with the appropriate acrylate ester. 2-Phenyl-4-methyl-$\Delta^2$-oxazolinone-5 can be prepared according to the procedure described by Gotthardt, Huisgen and Bayer in J. Amer. chem. Soc., 92, 4340 (1970). 2-phenyl-4-benzyl-$\Delta^2$-oxazolinone-5 can be prepared as described by Carter in Org. Reactions, 3, 205.

The esters of 1-methyl-4-phenyl and 1-benzyl-4-phenyl-7-azabicyclo[2.2.1]heptane-2,5- or 2,6-dicarboxylic acids can also be prepared by alkylating the alkali metal salts of the appropriate acid with the appropriate alkyl halide in a dipolar aprotic solvent such as N,N-dimethylformamide. Suitable alkali metal salts are the lithium, sodium and potassium salts. The required acids can be prepared by saponifying the methyl or ethyl ester of the corresponding acids.

Illustrative examples of the stabilizers of this invention are:

A. Dimethyl 1,4-diphenyl-7-azabicyclo[2.2.1]heptane-2,5- or 2,6-dicarboxylate

B. Diethyl 1-methyl-4-phenyl-7-azabicyclo[2.2.1]heptane-2,5- or 2,6-dicarboxylate C. Di-n-butyl 1-methyl-4-phenyl-7-azabicyclo[2.2.1]heptane-2,5- or 2,6-dicarboxylate D. Di-n-butyl 1-benzyl-4-phenyl-7-azabicyclo[2.2.1]heptane-2,5- or 2,6-dicarboxylate E. Di-n-butyl 1,4-diphenyl-7-azabicyclo[2.2.1]heptane-2,5- or 2,6-dicarboxylate F. Di-n-octyl 1-methyl-4-phenyl-7-azabicyclo[2.2.1]heptane-2,5- or 2,6-dicarboxylate G. Di-n-octyl 1,4-diphenyl-7-azabicyclo[2.2.1]heptane-2,5- or 2,6-dicarboxylate H. Di-(2-ethylhexyl) 1-methyl-4-phenyl-7-azabicyclo[2.2.1]-hepatane-2,5- or 2,6-dicarboxylate I. Di-n-octyl 1-benzyl-4-phenyl-7-azabicycl[2.2.1]heptane-2,5- or 2,6-dicarboxylate J. Di-(2-ethylhexyl) 1,4-diphenyl-7-azabicyclo[2.2.1]-heptane-2,5- or 2,6-dicarboxylate K. Di-(2-ethylhexyl) 1-benzyl-4-phenyl-7-azabicyclo[2.2.1]-heptane-2,5- or 2,6-dicarboxylate L. Di-n-dodecyl 1,4-diphenyl-7-azabicyclo[2.2.1]heptane-2,5- or 2,6-dicarboxylate M. Di-n-docedyl 1-methyl-4-phenyl-7-azabicyclo[2.2.1]-heptane-2,5- or 2,6-dicarboxylate N. Di-n-dodecyl 1-benzyl-4-phenyl-7-azabicyclo[2.2.1]-heptane-2,5- or 2,6-dicarboxylate O. Di-n-octadecyl 1,4-diphenyl-7-azabicyclo[2.2.1]heptane-2,5- or 2,6-dicarboxylate P. Di-n-octadecyl 1-methyl-4-phenyl-7-azabicyclo[2.2.1]-heptane-2,5- or 2,6-dicarboxylate Q. Di-n-octadecyl 1-benzyl-4-phenyl-7-azabicyclo[2.2.1]-heptane-2,5- or 2,6-dicarboxylate The preparation of the compounds employed as stabilizers in this invention is further illustrated in the following examples.

EXAMPLE 1

1,4-Diphenyl-7-Azabicyclo [2.2.1] heptane-2,5 or 2,6-Dicarboxylic Acid

To a solution of crude dimethyl 1,4-diphenyl-7-azabicyclo [2.2.1] heptane-2,5-or 2,6-dicarboxylate (61.8 g, 0.17 mole) in 240 ml of ethanol was added a solution of 85.8% potassium hydroxide (26.5 g, 0.41 mole) in 48 ml of water. The mixture was then heated under reflux for 16 hours. After clarification by filtration over filter aid the mixture was acidified with 33.1 ml of 37.6 percent hydrochloric acid. The precipitated solid was collected by filtration, and the filtrate was evaporated to dryness under reduced pressure to give a semi-solid residue. The solid material was washed thoroughly with water to give 14.8 g. of a white solid, m.p. 241°–243° dec. The semi-solid residue above was extracted with boiling methanol. The insoluble solid was filtered off and washed with water, methanol and then ether to give a second crop of 19.4 g of white solid, m.p. 234°–236° dec. The combined yield (34.2 g) was 60 percent. No suitable solvent could be found to recrystallize this highly insoluble amino acid. An analytical sample prepared by reprecipitation from sodium hydroxide solution had m.p. 241°–243° dec.

EXAMPLE 2

Di n-Butyl 1,4-Diphenyl-7-Azabicyclo [2.2.1] heptane-2,5 or 2,6-Dicarboxylate 1,4-diphenyl-7-azabicyclo [2.2.1] heptane-2,5 or 2,6-dicarboxylic acid (5.06 g, 0.015 mole) was dissolved in N KOH in methanol solution (30 ml, 0.03 mole). The solution was evaporated to dryness under reduced pressure and the dipotassium salt thus obtained was heated at 50°–60°/0.01 mm for several hours. The potassium salt was suspended in 150 ml of dry N,N-dimethylformamide, 1-bromobutane (4.11 g, 0.03 mole) was added, and the mixture was stirred and heated at 90°–95° for 20 hours. The solvent was evaporated under reduced pressure and the residue was dissolved in ether. The ether solution was filtered from insoluble material and then evaporated under reduced pressure to give 6.3 g of a yellow oil. Chromatography of this material on 160 g of silica gel using benzene-chloroform (1:1) as solvent gave the pure diester 5.4 g (80 percent) as a pale yellow oil.

EXAMPLE 3

Diethyl 1-Methyl-4-Phenyl-7-Azabicyclo [2.2.1] heptane-2,5 or 2,6-Dicarboxylate 2-phenyl-4-methyl-$\Delta^2$-oxazolinone-5 (10.0 g, 0.057 mole) was dissolved in 50 ml of ethyl acrylate and the mixture heated under reflux for 20 hours. Excess ethyl acrylate was evaporated under reduced pressure and the residue was dissolved in ether. The ether solution was saturated with hydrogen chloride gas. Water was added to dissolve the oily hydrochloride salt which had separated. The ether layer was separated and discarded. The aqueous solution was washed several times with ether and then the pH was adjusted to 11 by addition of 2N sodium hydroxide solution. The oil which was separated was extracted with either. Evaporation of the dried ($Na_2SO_4$) ether solution and distillation of the resulting oil in vacuo gave the title compound 3.8 g (20 percent) as the fraction b.p. 130°–132°/0.01 mm.

The compounds of this invention are stabilizers of organic material normally subject to thermal, oxidative or actinic light deterioration. Materials which are thus stabilized include synthetic organic polymeric substances including homopolymers, copolymers, and mixtures thereof, such as vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrene; poly-α-olefins such as high and low density polyethylene, cross-linked polyethylene, polyporpylene, poly(4-methylpentene-1 and the like, including copolymers of α-olefins; such as ethylene-propylene copolymers, and the like; dienes such as polybutadiene, polyisoprene, and the like, including copolymers with other monomers; polyurethanes such as are prepared from polyols and organic polyisocyanates, and polyamides such as polyhexamethylene adipamide and polycaprolactam; polyesters such as polyethylene terephthalates; polycarbonates such as those prepared from bisphenol-A and phosgene; polyacetals such as polyethylene terephthalate polyacetal; polystyrene, polyethyleneoxide; polyacrylics such as polyacrylonitrile; polyphenyleneoxides such as those prepared from 2,6-dimethylphenol and the like; and copolymers such as those of polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di (1,2-ethylene)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like; and alkylene gylcols, e.g., β-methoxyethyleneglycol, methoxytriethyleneglycol, triethylene glycol, octaethyleneglycol, dibutyleneglycol, dipropyleneglycol and the like.

The compounds of this invention are particularly useful as UV light stabilizers, especially for the protection of polyolefins, for instance, polyethylene, polypropylene, poly(butene-1), poly(pentene-1), poly (3-methylbutene-1), poly(4-methylpentene-1), various ethylene-propylene copolymers and the like.

In general, the stabilizers of this invention are employed from about 0.01 to about 5 percent by weight of the stabilized composition, although this will vary with the particular substrate and application. An advantageous range is from about 0.05 to about 2 percent and especially 0.1 to about 1 percent.

For addition to polymeric substrates, the stabilizers can be blended before polymerization or after polymerization, during the usual processing operations, for example, by hot-milling, the composition then being extruded, pressed, blow molded or the like into films, fibers, filaments, hollow spheres and the like. The heat stabilizing properties of these compounds may advantageously stabilize the polymer against degradation during such processing at the high temperature generally encountered. The stabilizers can also be disolved in suitable solvents and sprayed on the surface of films, fabrics, filaments or the like to provide effective stabilization. Where the polymer is prepared from a liquid monomer as in the case of styrene, the stabilizer may be dispersed or dissolved in the monomer prior to polymerization or curing.

These compounds can also be used in combination with other additives such as antioxidants, sulfur-containing esters such as distearyl-β-thiodipropionate (DSTDP), dilauryl-β-thiodipropionate (DLTDP) in an amount of from 0.01 to 2 percent by weight of the organic material, and the like, pourpoint depressants, corrosion and rust inhibitors, dispersing agents, demulsifiers, antifoaming agents, fillers such as glass or other fibers, carbon black, accelerators and the other chemicals used in rubber compounding, plasticizers, color stabilizers, di- and tri-alkyl- and alkylphenylphosphites, heat stabilizers, ultraviolet light stabilizers, antiozonants, dyes, pigments, metal chelating agents, dyesites and the like. Often combinations such as these, particularly the sulfur containing esters, the phosphites and/or the ultraviolet light stabilizers will produce superior results in certain applications to those expected by the properties of the individual components.

The following formula represents co-stabilizers which are in certain instances very useful in combination with the stabilizers of this invention:

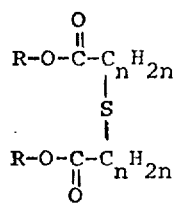

wherein R is an alkyl group having from 6 to 24 carbon atoms; and n is an integer from 1 to 6. Especially useful compounds of this type are dilauryl-$\beta$-thiodipropionate and distearyl-$\beta$-thiodipropionate. The above co-stabilizers are used in the amount of from 0.01 to 2 percent by weight of the organic material, and preferably from 0.1 to 1 percent.

Although the compounds of this invention may to some degree also be effective as thermal stabilizers, if the processing of the polymer is carried out at high temperatures it is advantageous to incorporate additional antioxidants.

In most applications, it is desirable to incorporate into the resin composition, sufficient thermal antioxidants to protect the plastic against thermal and oxidative degradation. The amount of antioxidant required will be comparable to that of the actinic stabilizer. Namely, from about 0.005 percent to 5 percent and preferably from 0.01 percent to 2 percent by weight Representative of such antioxidants are phosphite esters, such as triphenylphosphite and dibutylphosphite and alkyl arylphosphites such as dibutylphenylphosphite, and the like.

The best results have been obtained with the preferred class of thermal antioxidants, the hindered phenols. These compounds have been found to provide the best thermal stabilization with the least discoloration in the compositions of the invention. Among these phenolic antioxidants are included the following:

di-n-octadecyl(3-5-butyl-4-hydroxy-5-methylbenzyl)malonate
2,6-di-t-butylphenol
2,2'-methylene-bis(6-t-butyl-4-methylphenol)
2,6-di-t-butylhydroquinone
octadecyl-(3,5-di-t-butyl-4-hydroxybenzyl-thio)acetate
1,1,3-tris(3-t-butyl-6-methyl-4-hydroxyphenyl)-butane
1,4-bis(3,5-di-t-butyl-4-hydroxybenzyl)-2,3-5,6-tetramethylbenzene
2,4-bis-(3,5-di-t-butyl-4-hydroxyphenoxy)-6-(n-octylthio)-1,3,5-triazine
2,4-bis-(4-hydroxy-3,5-di-t-butylphenoxy)-6-(n-octylthioethylthio)-1,3,5-triazine
2,4-bis-(n-octylthio)-6-(3,5-di-t-butyl-4-hydroxyanilino)-1,3,5-triazine
2,4,6-tris-(4-hydroxy-3,5-di-t-butylphenoxy)-1,3,5-triazine
n-octadecyl-$\beta$-(3,5-di-t-butyl-4-hydroxyphenyl) propionate
n-octadecyl-3,5-di-t-butyl-4-hydroxybenzoate
2-(n-octylthio)ethyl-3,5-di-t-butyl-4-hydroxybenzoate
stearamido N,N-bis- {ethylene 3-(3,5-di-t-butyl-4-hydroxyphenyl)propionate}
1,2-propylene glycol bis-{3-(3,5-di-t-butyl-4-hydroxyphenyl)propionate}
pentaerythritol tetrakis-{3-(3,5-di-t-butyl-4-hydroxyphenyl)propionate}
dioctadecyl-3,5-di-t-butyl-4-hydroxybenzylphosphonate
di-n-octadecyl-1-(3,5-di-t-butyl-4-hydroxyphenyl)-ethanephosphonate The above phenolic hydrocarbon stabilizers are known and many are commercially available.

The above antioxidants have been listed only for the purpose of illustration and it is important to note that any other antioxidant can be employed with similar improved results. The above exemplified antioxidants and other related antioxidants which are incorporated herein by reference, are disclosed in greater detail in the following patents: Netherlands Patent specification 67/1119, issued Feb. 19, 1968; Netherlands Patent specification 68/03498 issued Sept. 18, 1968; U.S. Pat. Nos. 3,255,191; 3,330,859, 3,644,482, 3,281,505; 3,531,483, 3,285,855; 3,364,250; 3,368,997; 3,357,944 and 3,758,549.

EXAMPLE 4

Artificial Light Exposure Test

Deterioration of most polymers caused by ultraviolet light is so slow at ambient temperatures, even in the absence of stabilizers, that testing of the effects of stabilizers generally must be conducted either at higher temperatures or in an accelerated artificial light exposure device in order to yield results in a convenient period of time. The tests conducted on polymers using an aritficial light exposure device is described below:

a. Sample Preparation 5 mil Film — Unstabilized polypropylene powder (Hercules Profax 6501) is thoroughly blended with the indicated amounts of additives. The blended material is then milled on a two roll mill for 5 minutes at 182°C. The milled sheet is then compression molded at 220°C into 5 mil thick film under a pressure of 175 psi and water cooled in the press.

b. Testing Method

This test is conducted in a FS/BL unit, basically of the American Cyanamid design, which consists of 40 tubes of alternating fluorescent sunlamps and black lights (20 of each). The 5 mil sample film which are mounted on 3 × 2 IR card holders with ¼ × 1 windows and are placed on a rotating drum 2 inches from the bulbs in the FS/BL unit. The time in hours is noted for the development of 0.5 carbonyl absorbance units are determined on an Infrared Spectrophotometer. The development of carbonyl functional groups in the polymer is proportional to the amount of degradation caused by the ultraviolet light exposure.

The test results reported below were obtained according to the procedures described above. The amounts of the additives are expressed in weight per cent based on the weight of the polymer.

TABLE 1

| | Light Stabilization of Polypropylene | | |
|---|---|---|---|
| | | Time in Hours to 0.5 Carbonyl Absorbance Units | |
| | Stabilizer | Formul. A | Formul. B |
| 1 | Compound A | 440 | 860 |
| 2 | Compound B | 475 | 820 |
| 3 | Compound D | 660 | 1855 |
| 4 | Compound E | 700 | 1370 |
| 5 | Compound G | 580 | 1670 |
| 6 | Compound J | 680 | 1918 |
| 7 | Compound K | 645 | 1740 |
| 8 | Compound L | 555 | 1135 |
| 9 | Compound O | 470 | 1000 |
| 10 | None | 230 | 555 |

Other hindered phenolic antioxidants may be used in place of di-octadecyl(3,5-di-t-butyl-4-hydroxybenzyl)-phosphonate in the above mentioned compositions for example, di-n-octadecyl α-(3-t-butyl-4-hydroxy-4-methylbenzyl)malonate, 2,4-bis (n-octylthio)-6-(3,4-di-t-butyl-4-hydroxyaniline)-1,3,5-triazine, octadecyl 3-(3',5'-di-t-butyl-4'-hydroxyphenyl)propionate, pentaerithritol-tetrakis(3-(3,5-di-t-butyl-4-hydroxyphenyl))propionate, tris-(3,5-di-t-butyl-4-hydroxybenzyl)isocyanurate, 2,6-di-tert-butyl-4-methylphenol, N,-N,N-tris-(3,5-di-tert-butyl-4-hydroxybenzyl)isocyanurate, and 2,4,6-tris(3,5-di-tert-butyl-4-hydroxybenzyl)-1,3,5-trimethylbenzyl.

The compositions of Table 1 are also stabilized with 2(2'-hydroxy-3',5'-di-t-butylphenyl)-5-chlorobenzotriazole is replaced with the following UV absorbers:

a. 2-hydroxy-4-methoxy-5-sulfobenzophenone trihydrate b. 2-hydroxy-4-n-octoxybenzophenone c. {2,2'-thiobis(4-t-octylphenolate)}-n-butylamine nickel II d. p-octylphenyl salicylate e. 2,2'-dihydroxy-4,4'-dimethoxybenzophenone f. 2(2'-hydroxy-5'-methylphenyl)-benzotriazole.

EXAMPLE 5

High impact polystyrene resin containing elastomer (i.e., butadiene-styrene) is stabilized against loss of elongation properties due to exposure to ultraviolet light by incorporation of 0.3 percent by weight of di-n-butyl 1-methyl-4-phenyl-7-azabicyclo-[2.2.1]heptane-2,5- or 2,6-dicarboxylate.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2,000 pounds per square inch into a sheet of uniform thickness (25 mil). The sheets are then cut into strips approximately 4 × 0.5 inches. A portion of these strips is then measured for percent of elongation in the Instron Tensile Testing Apparatus (Instron Engineering Corporation, Quincy, Massachusetts). The remaining portions of the strips are placed in an FS/BL chamber according to Example 7(B) except that the samples are mounted and white cardboard stock and the time to 50 percent reduction in elongation is measured. The stabilized polystyrene resin retains its elongation property longer than the unstabilized resin.

EXAMPLE 6

Unstabilized linear polyethylene is solvent blended in methylene chloride with 0.5 percent by weight of the substrate of di-n-octyl 1-methyl-4-phenyl-7-azabicyclo[2.2.1]heptane-2,5- or 2,6-dicarboxylate and then vacuum dried. The resin is then extrusion compounded on a 1 inch 24/1=L/D extruder, melt temperature 450°F. (232°C) and pressed for 7 minutes at a temperature of 163°C and a pressure of 2,000 psi into a sheet of uniform thickness of 100 mil. The sheets are then cut into plaques of 2 inch × 2 inch. The plaques are then exposed in a FS/BL exposure device and color measurements made periodically using a Hunter Color Difference Meter Model D25. Polyethylene stabilized with the above compound is found to be much more stable than the unstabilized polyethylene or the polyethylene stabilized only with an antioxidant. is mixed for 5 minutes after which it is cooled and compression molded at 125°C into 5° × 0.025 inch plaques.

The plaques are exposed to a xenon arc weatherometer and the color measurement (L-b) is made after 45, 125 and 290 hours. The samples stabilized with the above compound are found to be much more light stable than the unstabilized samples.

EXAMPLE 7

A quantity of SBR emulsion containing 100 g of rubber (500 ml of 20 percent SBR obtained from Texas U.S., Synpol 1500) previously stored under nitrogen, is placed in a beaker and stirred vigorously. The pH of the emulsion is adjusted to 10.5 with a 0.5N NaOH solution.

To the emulsion is added 50 ml of 25 percent NaCl solution. A 6 percent NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6 percent NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (<1 mm) at 40°–45°C.

The dried rubber (25 g) is heated under nitrogen at 125°C in a Brabender mixer and to this is added with mixing 0.5 percent of di-(2-ethylhexyl) 1-methyl-4-phenyl-7-azabicyclo[2.2.1]-heptane-2,5- or 2,6-dicarboxylate. The composition

EXAMPLE 8

To 50 g of polyacetal resin containing 0.1 percent of an acid scavenger, dicyandiamide, is added 0.2 percent by weight of di-n-octyl 1-benzyl-4-phenyl-7-azabicyclo-

[1.1.1]heptane-2,5- or 2,6-dicarboxylate and milled for 7 minutes at 200°C in a Brabender Plasti-recorder. The milled formulation is subsequently pressed into a 40 mil sheet at 215°C at 350 psi for 90 seconds then cooled quickly in a cold press at 350 psi. The stabilized sheets are then remolded for 2 minutes at contact pressure and for 3 minutes at 300 psi at 215°C to give plaques 1 ½ inch × 2 ¼ inch × 125 mil. Thereafter, the testing procedure of Example 9 is followed to determine the light stability of the samples. The stabilized samples are found to be much more stable than the unstabilized samples.

EXAMPLE 9

Unstabilized thoroughly dried polyethylene tetephthalate chips are dry blended with 1.0 percent of di-n-dodecyl 1-methyl-4-phenyl-7-azabicyclo [2.2.1]-heptane-2,5- or 2,6-dicarboxylate. 60/10 denier multi-filament is melt spun at a melt temperature of 290°C. The oriented fiber is wound on white cards and exposed in a Xenon Arc Fadeometer. Color measurements are made periodically with a Hunter Color Difference Meter Model D25. The stabilized samples are found to be much more light stable than the unstabilized samples.

What is claimed is:

1. A composition of matter comprising an organic material normally subject to deterioration stabilized with (a) 0.01 to 5 percent of a stabilizer having the formula

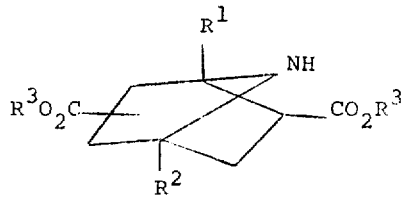

wherein
  $R^1$ is phenyl,
  $R^2$ is phenyl, benzyl or lower alkyl, and
  $R^3$ is alkyl from 1 to 24 carbons,
(b) 0 to 5 percent of a phenolic antioxidant and (c) 0 to 5 percent of a thio co-stabilizer.

2. A composition of claim 1 wherein $R^2$ is phenyl, benzyl or methyl and $R^3$ is alkyl having 4 to 8 carbons.

3. A composition of claim 1 wherein (b) the phenolic antioxidant is selected from di-n-octadecyl 3,5-di-tert-butyl-4-hydroxybenzylphosphonate, di-n-octadecyl-α,α'-bis(3-butyl-4-hydroxy-5-methylbenzyl)malonate and 2,4-bis(4-hydroxy-3,5-di-tert-butylphenoxy)-6-(n-octylthioethylthio)-1,3,5-triazine, and (c) the thio co-stabilizer is selected from dilauryl-β-thiodipropionate and distearyl-β-thiodipropionate.

4. A composition of claim 3 wherein the organic material is polyolefin.

5. A composition of claim 4 wherein the polyolefin is polypropylene.

6. A composition of claim 5 wherein the stabilizer is

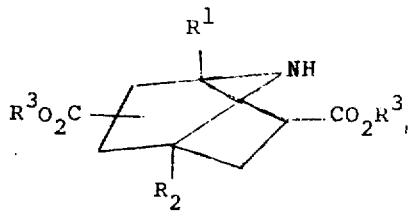

wherein
  $R^1$ is phenyl,
  $R^2$ is phenyl, benzyl or methyl,
  $R^3$ is alkyl having from 4 to 8 carbons.

7. A composition of claim 6 containing di-n-octadecyl(3,5-di-tert-butyl-4-hydroxybenzyl phosphonate and 2(2'-hydroxy-3',5'-di-tert-butylphenyl)-5-chlorobenzotriazole.

8. A composition of claim 7 wherein the stabilizer is di-n-butyl 1,4-diphenyl-7-azabicyclo[2.2.1]heptane-2,5- or 2,6-dicarboxylate.

9. The composition of claim 7, wherein the stabilizer is di-(2-ethylhexyl) 1,4-diphenyl-7-azabicyclo [2.2.1] heptane-2,5-or 2,6-dicarboxylate.

10. The composition of claim 7 wherein the stabilizer is di-n-butyl 1-benzyl-4-phenyl-7-azabicyclo [2.2.1] heptane-2,5-or 2,6-dicarboxylate.

11. The composition of claim 7, wherein the stabilizer is di-(2-ethylhexyl) 1-benzyl-2-phenyl-7-azabicyclo [2.2.1] heptane-2,5- or 2,6-dicarboxylate.

12. The composition of claim 7, wherein the stabilizer is di-n-butyl 1,4-diphenyl-7-azabicyclo [2.2.1] heptane-2,5- or 2,6- dicarboxylate.

13. The composition of claim 7 wherein the stabilizer is di-n-octyl 1,4-diphenyl-7-azabicyclo[2.2.1]heptane-2,5- or 2,6- dicarboxylate.

* * * * *